H. CHEREP.
TRAP.
APPLICATION FILED JULY 1, 1918.
1,305,588.
Patented June 3, 1919.
2 SHEETS—SHEET 1.
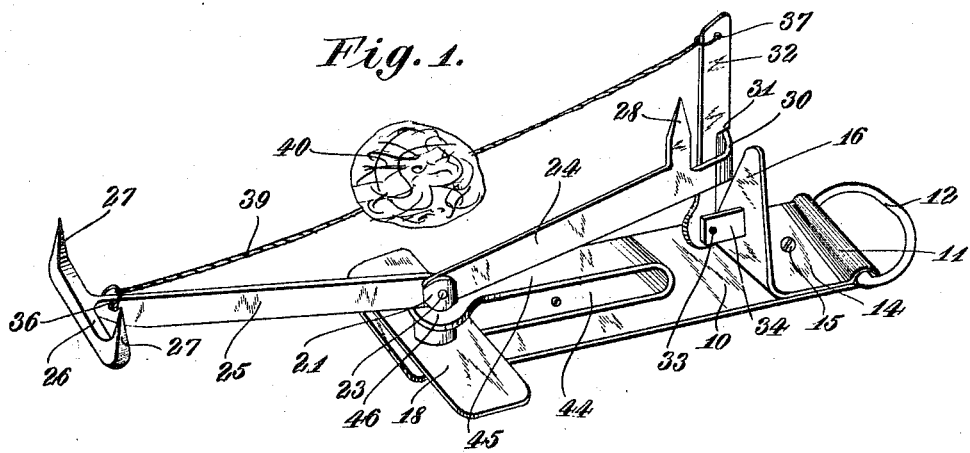
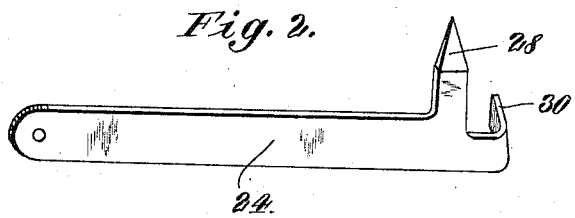
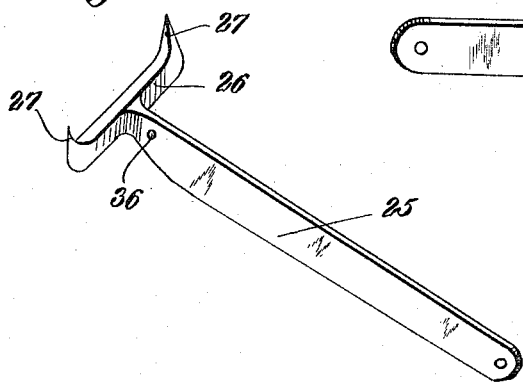
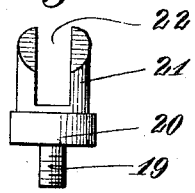
INVENTOR
Henry Cherep.
BY Oscar Geier
his ATTORNEY

H. CHEREP.
TRAP.
APPLICATION FILED JULY 1, 1918.

1,305,588.

Patented June 3, 1919.
2 SHEETS—SHEET 2.

INVENTOR
Henry Cherep.
BY
his ATTORNEY

UNITED STATES PATENT OFFICE.

HENRY CHEREP, OF CHAPLIN, SASKATCHEWAN, CANADA.

TRAP.

1,305,588.　　　　　Specification of Letters Patent.　　Patented June 3, 1919.

Application filed July 1, 1918. Serial No. 242,857.

*To all whom it may concern:*

Be it known that I, HENRY CHEREP, a subject of the Emperor of Austria, residing at Chaplin, Province of Saskatchewan, and Dominion of Canada, have invented certain new and useful Improvements in Traps, of which the following is a specification.

This invention relates to improvements in animal traps and particularly to types adapted to be operated in combination with a lure or bait, which, when moved by the animal, causes the trap to be sprung.

The principal object of the invention is to provide an effective trap for catching the smaller animals such as rats and mice, the trap acting to hold and kill the animal caught therein.

This object is attained by the novel construction and combination of parts hereinafter described and shown in the accompanying drawings, forming a material part of this disclosure, and in which:—

Figure 1 is a perspective view, showing a trap made in accordance with the invention, the parts being in an extended or set position.

Fig. 2 is a perspective view, showing one of the details employed.

Fig. 3 is a similar perspective view, showing another detail.

Fig. 4 is a plan view of a third detail.

Fig. 5 is a side elevational view of another detail.

Figure 6:
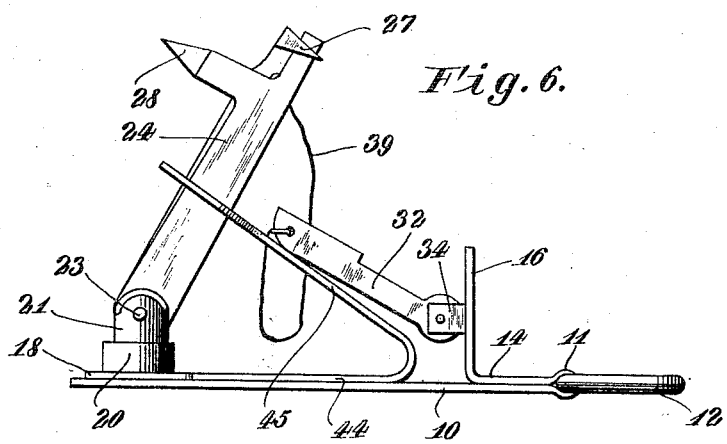
Fig. 6 is a side elevational view, showing the trap in a sprung or closed position.

The trap is comprised of metallic base plate 10, folded upon itself, so as to form a tubular loop 11, in which is engaged a ring 12, for the purpose of attaching a chain or securing means, or to suspend the trap when not being used.

The in-turned portion 14 of the plate is secured by a screw 15 to the base portion and terminates in an upright end 16, having beveled side edges.

Firmly secured to the base plate 10 is a transverse plate 18, and into these plates is screwed a threaded stud 19, having an enlarged body 20, and reduced extending end 21, formed with a slot 22, a pin 23, passing through the upper end of the stud, and pivoted on the pin are plate lever arms 24 and 25 respectively, the latter element having an integral T shaped head 26, formed with a pair of sharp projecting prongs 27.

The opposite arm 24 is provided with a single central sharp prong 28, and an angularly bent end 30, engageable against the catch 31, formed with a detent 32, pivoted on the pin 33, set in a lug 34, fixed on the upright plate 16.

Figure 7:
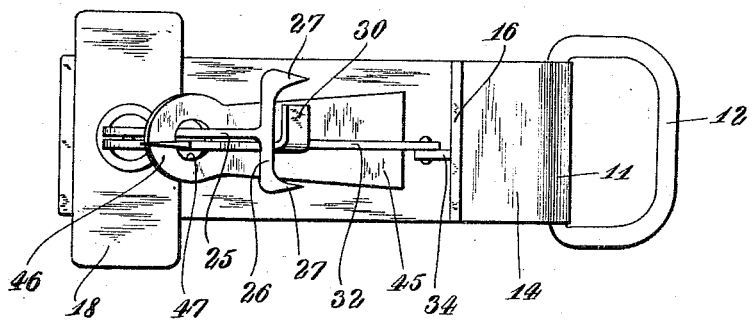
Fig. 7 is a top plan view of the same.

Extending from an opening 36, formed in the lever 25, to a similar opening 37, formed in the top of the detent 32, is a cord or wire 39 upon which a lure or bait 40 may be secured, preferably at the center. Fastened upon the base plate 10 is the lower portion 44 of a bent flat spring folded upon itself, the upper portion 45 having a head 46 through which is a circular opening 47, adapted to move freely over the end 21 of the stud and press against the lower surface of the lever arms 24 and 25 to such an extent as to snap the levers together whenever the bent end 30 of the lever arm 24 is disengaged upon the catch 31. It will be obvious that upon an animal making contact with the lure 40, so as to draw the detent 32 away from the arm, that the lever 24 will be freed, permitting the spring 45 to operate, closing the lever arms instantly together into the position shown in Figs. 6 and 7, the prong 28 impaling the animal held between the prongs 27 of the T-shaped head 26.

It is believed that the foregoing description and drawing render the construction and use of the trap sufficiently evident to enable the same to be made and operated.

Having thus described my invention what I claim as new and desire to secure by Letters Patent, is.

1. An animal trap, comprising a base, a cylindrical standard arranged thereon, and a pair of levers pivoted in said standard, prongs formed at the extremities of said levers, a spring on said base having a part movable longitudinally over said standard, and adapted to engage with said levers whereby they are closed, an arm pivoted near the end of said base, a detent formed integral with one of said levers, engageable with said arm, a flexible element extending between said detent and the other of said levers, and a lure on said flexible element, said detent adapted to be operated by a pull on said flexible element.

2. An animal trap, comprising a base having a portion bent upon itself and a vertical element formed therewith, of a ring in said base, a platform secured at the opposite end of said base, a flat spring fixed upon said base, said spring having a circular opening at its front end above said platform, a plug secured in said platform and said base, a pair of levers pivoted at the upper end of said plug against which said spring makes contact, a pair of prongs formed at the end of one of said levers, a single prong formed to the end of the other of said levers, a bent arm formed with the last named lever, a swinging detent pivoted on the upturned portion of said base, said swinging detent having an abutment adapted to engage with said bent arm, a flexible element extending between the outer end of the first named lever, and said detent, and a lure fixed upon said flexible element adapted to retract said detent, whereby the prong carrying levers are forced together by the action of said spring.

In testimony whereof I have affixed my signature.

HENRY CHEREP.